3,454,550
PHENYLAZOPHENYL COMPOUNDS CONTAINING HETEROCYCLIC DICARBOXYLIC ACID IMIDE GROUPS
Gordon Clay Newland, Kingsport, Tenn., assignor to Eastman Kodak Company, Rochester, N.Y., a corporation of New Jersey
No Drawing. Continuation-in-part of application Ser. No. 426,355, Jan. 18, 1965. This application Nov. 29, 1967, Ser. No. 686,739
Int. Cl. C09b 29/36, 29/38; C08g 51/60
U.S. Cl. 260—152                12 Claims

ABSTRACT OF THE DISCLOSURE

Compounds useful as colorants and UV stabilizers for plastic materials defined by the formula

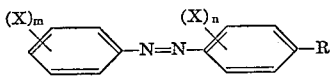

wherein X may be various defined substituents and R may be various defined heterocyclic dicarboxylic acid imide radicals.

---

This is a continuation-in-part of U.S. application Ser. No. 426,355, filed Jan. 18, 1965, now U.S. Patent No. 3,361,707.

This invention relates to certain compounds for use as combination colorants and ultraviolet light stabilizers for plastic materials and to colored plastic compositions stabilized against the degradative effects of ultraviolet light.

In the manufacture of plastic articles it is often desirable to add attractive color to the plastic composition. In the case of molded articles of thick sections the color is usually the result of a colorant milled into the plastic prior to molding. When the finished articles are fibers or fabric the color is often induced by dyeing. However, in the case of certain plastic materials dyeing is difficult to accomplish and a number of the dyes lack light fastness. Even in the case of articles molded from pigmented plastic materials, colors therein often fade on exposure to ultraviolet light. Hence, there is a need for colorants for plastic materials which provide attractive colors and resist fading on exposure to ultraviolet light.

As is well known, various plastic materials undergo photochemical degradation when exposed to ultraviolet light. This effect is frequently termed weathering. It appears to be a photooxidation process which causes rupture of the polymer chains and formation of carbonyl (=C=O) groups. As this degradation progresses, articles manufactured from such plastic materials tend to crack, become brittle and lose tensile strength to the extent of mechanical falure. Hence, there is a problem inhibiting the ultraviolet light deterioration of plastic materials. One solution to the problem is to add to the plastic material a compound which inhibits its ultraviolet light degradation. However, many colorants either nullify or substantially reduce the effectiveness of such compounds as ultraviolet light stabilizers.

According to this invetnion there has been found a class of compounds having utility as colorants as well as ultraviolet light inhibitors for various plastic materials. These compounds have high tinctorial properties and exhibit good properties of compatibility with plastic materials and may be easily incorporated therein by conventional compounding procedures. The plastic compositions containing these compounds have a high degree of light fastness and have good stability toward the degradative effects of ultraviolet light.

In general, the class of compounds having the above described dual purpose utility in plastic materials may be defined by the formula:

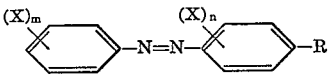

wherein m is an integer of 0–5 and n is an integer of 0–4; each X is a radical independently selected from the group consisting of hydrogen, halogen, alkyl having 1–20 carbon atoms, alkoxy having 1–20 carbon atoms, hydroxy, cyano, amino, alkylamino, hydroxyalkylamino, cyanoalkylamino, phenylamino, nitro, sulfamido, trifluoromethyl, aryl, alkylaryl, alkoxyaryl, phenoxy, alkylsulfonyl, morpholino, thiomorpholino, and triazeno;

and R is selected from the group consisting of:

(1)

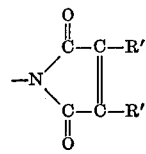

wherein each R' is a radical independently selected from the group consisting of hydrogen, alkyl having 1–20 carbon atoms, alkoxy having 1–20 carbon atoms, aryl, alkylaryl, hydroxy, nitro, cyano and halogen;

(2)

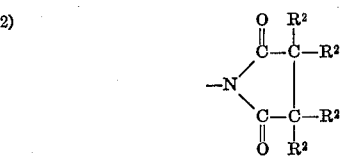

wherein each $R^2$ is a radical independently selected from the group consisting of hydrogen, alkyl having 1–20 carbon atoms, alkoxy having 1–20 carbon atoms, aryl, alkylaryl, hydroxy, cyano and halogen;

(3)

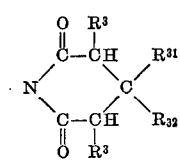

wherein each $R^3$ is a radical independently selected from the group consisting of hydrogen, alkyl having 1–20 carbon atoms, alkoxy having 1–20 carbon atoms, aryl, alkylaryl, hydroxy, cyano and halogen;
and each $R^{31}$ and $R^{32}$ may the same as $R^3$ defined above or, when taken together with the carbon atom to which they are attached, represent a cyclic or heterocyclic ring having up to six members;

(4)

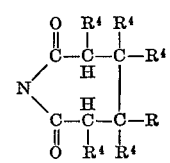

wherein each $R^4$ is a radical independently selected from the group consisting of hydrogen, alkyl having 1–20 carbon atoms, alkoxy having 1–20 carbon atoms, aryl, alkylaryl, hydroxy, cyano and halogen;

(5)

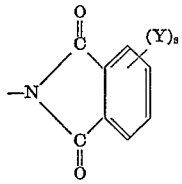

wherein s in an integer of 0–4;
and each Y is a radical independently selected from the group consisting of hydrogen, alkyl having 1–20 carbon atoms, alkoxy having 1–20 carbon atoms, aryl, alkylaryl, hydroxy, cyano and halogen;

(6)

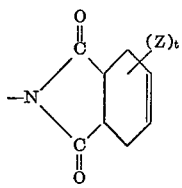

wherein t is an integer of 0–4;
and each Z is a radical independently selected from the group consisting of hydrogen, alkyl having 1–20 carbon atoms, alkoxy having 1–20 carbon atoms, aryl, alkylaryl, hydroxy, cyano and halogen;

(7)

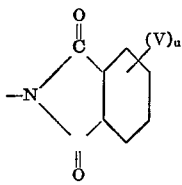

wherein u is an integer of 0–4;
and each V is a radical independently selected from the group consisting of hydrogen, alkyl having 1–20 carbon atoms, alkoxy having 1–20 carbon atoms, aryl, alkylaryl, hydroxy, cyano and halogen; and

8)

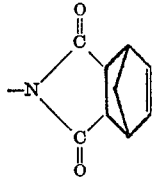

Some typical examples of these compounds are as follows:

N-[p-(phenylazo)phenyl]maleimide
N-[p-(p-methoxyphenylazo)phenyl]maleimide
N-[2,5-dimethyl-4-(o-tolylazo)phenyl]maleimide
N-[p-(p-nitrophenylazo)phenyl]maleimide
N-[p-(4-acetoxy-2-methoxyphenylazo)phenyl]maleimide
N-[4-(p-chlorophenylazo)-2,5-diethoxyphenyl]maleimide
N-[4-(m-propionamidophenylazo)-2-5-diethoxyphenyl]maleimide
N-[p-(p-tert-butylphenylazo)phenyl]maleimide
N-[4-(p-tert-butylphenylazo)-3-hydroxyphenyl]maleimide
N-[4-(p-octylphenyl)-3-hydroxyphenyl]maleimide
N-[p-(2,4-dihydroxyphenylazo)phenyl]maleimide
N-[4-(o-hydroxyphenylazo)-3-hydroxyphenyl]maleimide
N-[p-(2-hydroxy-4-dodecyloxyphenylazo)phenyl]maleimide
N-[p-(p-trifluoromethylphenylazo)phenyl]maleimide
N-[p-(2-chloro-4-tert-butylphenylazo)phenyl]maleimide
N-[4-(2-chloro-4-tert-butylphenylazo)-3-chlorophenyl]maleimide
N-[p-(p-octylphenylazo)phenyl]maleimide
N-[p-(dodecyloxyphenylazo)phenyl]maleimide
N-[p-(p-octylphenylazo)phenyl]maleimide
N-[p-(3,5-di-tert-amylphenylazo)phenyl]maleimide
N-[4-(p-octylphenylazo)-2,5-dimethoxyphenyl]maleimide
N-[p-(p-benzoyloxyphenylazo)phenyl]maleimide
N-[4-phenylazo-1-napthyl]maleimide
N-[p-(o-hydroxyphenylazo)phenyl]-2-(1-dodecen-1-yl)succinimide
N-[p-(p-hydroxyphenylazo)phenyl]-2-(1-dodecen-1-yl)succinimide
N-[p-(3,5-di-tert-amylphenylazo)phenyl]-2-(1-dodecen-1-yl)succinimide
N-[4-(3,5-di-tert-amylphenylazo)-3-hydroxyphenyl]-2-(1-dodecen-1-yl)succinimide
N-[p-(p-hydroxyphenylazo)phenyl]-3,3-tetramethyleneglutarimide
N-[p-(o-hydroxyphenylazo)phenyl]-3,3-tetramethyleneglutarimide
N-[4-(3,5-di-tert-amylphenylazo)-3-hydroxyphenyl]-3,3-tetramethyleneglutarimide
N-[p-(p-nitrophenylazo)phenyl]-2-(1-dodecen-1-yl)succinimide
N-[p-(2-hydroxy-4-nitrophenylazo)phenyl]-2-(1-dodecen-1-yl)succinimide
N-[p-(p-hydroxyphenylazo)phenyl]phthalimide
N-[p-(2-chloro-4-methylphenylazo)phenyl]phthalimide
N-[p-[4-(β-hydroxyethylamino)phenylazo]phenyl]maleimide
N-[p-(p-hydroxyphenylazo)phenyl]itaconimide
N-[p-(p-acetylphenylazo)phenyl]phthalimide
N-[p-(p-dimethylaminophenylazo)phenyl]-3-octylphthalimide
N-[p-[p-di-(β-hydroxyethyl)aminophenylazo]phenyl]maleimide
N-[4-(p-tolylazo)-2,5-dimethoxyphenyl]succinimide
N-[p-(p-hydroxyphenylazo)phenyl]-1,2,3,6-tetrahydrophthalimide
N-[p-(p-hydroxyphenylazo)phenyl]-3,6-endomethylene-1,2,3,6-tetrahydrophthalimide
N-[p-(phenylazo)phenyl]-2-bromomaleimide
N-[p-(phenylazo)phenyl]-2,3-dichloromaleimide
N-[p-(phenylazo)phenyl]-2,3-dimethylmaleimide
N-[p-(phenylazo)phenyl]succinimide
N-[p-(phenylazo)phenyl]-2-methylsuccinimide
N-[p-(phenylazo)phenyl]-2-(1-decen-1-yl)succinimide
N-[p-(phenylazo)phenyl]-2-(1-dodecen-1-yl)succinimide
N-[p-(phenylazo)phenyl]-n-octadecylsuccinimide
N-[p-(phenylazo)phenyl]citraconimide
N-[p-(phenylazo)phenyl]glutarimide
N-[p-(phenylazo)phenyl]-3,3-tetramethyleneglutarimide
N-[p-(phenylazo)phenyl]-2-phenylglutarimide
N-[p-(phenylazo)phenyl]phthalimide
N-[p-(phenylazo)phenyl]-2-hydroxyphthalimide
N-[p-(phenylazo)phenyl]hexahydrophthalimide
N-[p-(phenylazo)phenyl]-1,2,3,6-tetrahydrophthalimide
N-[p-(phenylazo)phenyl]-3,6-endomethylene-1,2,3,6-tetrahydrophthalimide While the use of the above-described compounds in plastic materials as combination colorants and ultraviolet light inhibitors is novel, certain of the compounds per se are also considered novel and form a part of the invention.

In J. Chem. Soc. (1955), 2970, there is described a synthesis for N-[p-(phenylazo)phenyl]maleimide. The remaining compounds which are useful in plastic materials as described are considered novel and may generally be prepared by first reacting an appropriate substituted or unsubstituted phenylazoaniline with an appropriate anhydride and then dehydrating and cyclizing the reaction product using acetic anhyride. These general reactions and the conditions to be employed are readily understood by those skilled in the art. However, to further illustrate the preparation of these compounds the following examples are presented:

Example 1.—Preparation of N-[2,5-dimethyl-4-(o-tolylazo)phenyl]maleimide

Twelve grams (0.05 mole) of 2,5-dimethyl-4-(o-tolylazo)aniline are dissolved in 200 ml. of chloroform and mixed with 100 ml. of chloroform containing 4.9 g. (0.05 mole) of maleic anhydride. The mixture is stirred at room temperature for 2 hrs., chilled and the orange precipitate collected in a Buchner funnel. The filter cake is washed several times with ether and air dried. The dry product is then combined with 100 ml. of 10% aqueous sodium carbonate, stirred 1 hr., chilled and filtered. The resulting filter cake is dissolved in 250 ml. of hot water and made acidic with dilute hydrochloric acid. The resulting precipitate is then collected, washed with water and ethanol, and air dried to give 9.2 g. orange solid melting at 218–220° C., identified as 2',5'-dimethyl-4'-(o-tolylazo)maleanilic acid. Nine grams of 2',5'-dimethyl-4'-(o-tolylazo)maleanilic acid are combined with 100 ml. acetic anhydride. The mixture is heated to 80° C. with stirring for 30 min. to effect solution. Upon being cooled, a reddish-orange precipitate is formed. The solution is further chilled, filtered and washed with water. The product, N-[2,5-dimethyl-4-(o-tolylazo)-phenyl]maleimide, is recrystallized from benzene to give 5.5 g. of product melting at 152–154° C., which analyzes at 13.8% nitrogen whereas the theoretical value is 13.1%.

Example 2.—Preparation of N-[4-(p-chlorophenylazo)-2,5-diethoxyphenyl]maleimide

Following a similar procedure as described in Example 1, 4-(p-chlorophenylazo)-2,5-diethoxyaniline and maleic anhydride are reacted to form an intermediate reaction product. The reaction product is then dehydrated and cyclized using acetic anhydride resulting in a product identified at N - [4 - (p-chlorophenylazo)-2,5-diethoxyphenyl]maleimide.

Example 3.—Preparation of N-[p-(p-nitrophenylazo)-phenyl]maleimide

Again following a similar procedure as described in Example 1, p-(p-nitrophenylazo)aniline and maleic anhydride are reacted to form an intermediate reaction product. The reaction product is then dehydrated and cyclized using acetic anhydride to give a product identified as N-[p-(p-nitrophenylazo)phenyl]maleimide.

Example 4.—Preparation of N-[4-(m-propionamidophenylazo)-2,5-diethoxy-phenyl]maleimide In accordance with a similar procedure as described in Example 1, 4 - (m-propionamidophenylazo)-2,5-diethoxy-aniline and maleic anhydride are reacted to form an intermediate reaction product. The reaction product is then dehydrated and cyclized using acetic anhydride thereby providing a product identified as N-[4-(m-propionamidophenylazo)-2,5-diethoxy-phenyl]maleimide.

Example 5.—Preparation of N-[p-(phenylazo)-phenyl]2-bromomaleimide

Following a similar procedure as set forth in Example 1, p-phenylazoaniline and bromomaleic anhydride are reacted to form an intermediate product. The intermediate product is then dehydrated and cyclized using acetic anhydride to give a product identified as N-[p-(phenylazo)phenyl]-2-bromomaleimide.

Example 6.—Preparation of N-[p-(phenylazo)-phenyl]-2,3-dimethylmaleimide

P-phenylazoaniline and 2,3-dimethylmaleic anhydride are reacted in accordance with a similar procedure as in Example 1 to form an intermediate product. Using acetic anhydride the intermediate product is dehydrated and cyclized to form a product identified as N-[p-(phenylazo)phenyl]-2,3-dimethylmaleimide.

Example 7.—Preparation of N-[p-(phenylazo)-phenyl]-succinimide

In accordance with a similar procedure as in Example 1, p-phenylazoaniline and succinic anhydride are reacted to form an intermediate reaction product. The reaction product is then dehydrated and cyclized using acetic anhydride to give a product identified as N-[p-(phenylazo)phenyl]-succinimide.

Example 8.—Preparation of N-[p-(phenylazo)phenyl]-2-(1-decen-1-yl)succinimide

Following a similar procedure as in Example 1, p-phenylazoaniline and 2-(1-decen-1-yl)succinic anhydride are reacted to form an intermediate reaction product. Using acetic anhydride the reaction product is dehydrated and cyclized to form a product identified as N-[p-(phenylazo)phenyl]-2-(1-decen-1-yl)succinimide.

Example 9.—Preparation of N-[p-phenylazo)phenyl]-n-octadecylsuccinimide

In accordance with a similar procedure as set forth in Example 1, p-phenylazoaniline and n-octadecylsuccinic anhydride are reacted to form an intermediate product. The intermediate product is then dehydrated and cyclized using acetic anhydride to form a product identified as N-[p-(phenylazo)phenyl]-n-octadecylsuccinimide.

Example 10.—Preparation of N-[p-(phenylazo)phenyl]-glutarimide

P-phenylazoaniline and glutaric anhydride are reacted in accordance with a similar procedure as set forth in Example 1 to form an intermediate reaction product. Using acetic anhydride the reaction product is then dehydrated and cyclized to form a product identified as N-[p-(phenylazo)phenyl]glutarimide.

Example 11.—Preparation of N-[p-(phenylazo)phenyl]-3,3-tetramethylene-glutarimide In accordance with a similar procedure as set forth in Example 1, p-phenylazoaniline and 3,3-tetramethyleneglutaric anhydride are reacted to form an intermediate reaction product. The reaction product is then dehydrated and cyclized using acetic anhydride to form a product identified as N-[p-(phenylazo)phenyl]-3,3- tetramethylene-glutarimide.

Example 12.—Preparation of N-[p-(phenylazo)phenyl]-2-phenylglutarimide

Following a similar procedure as set forth in Example 1, p - phenylazo - aniline and 2 - phenylglutaric anhydride are reacted to form an intermediate reaction product. The reaction product is then dehydrated and cyclized using acetic anhydride to form a product identified as N-[p-(phenylazo)phenyl]-2-phenyl glutarimide.

Example 13.—Preparation of N-[p-(phenylazo)phenyl]phthalimide

P-phenylazoaniline and phthalic anhydride are reacted in a manner similar to the procedure set forth in Example 1 to form an intermediate reaction product. Using acetic anhydride the intermediate reaction product is then dehydrated and cyclized to form a product identified as N-[p-(phenylazo)phenyl]phthalimide.

Example 14.—Preparation of N-[p-(phenylazo)phenyl]-2-hydroxyphthalimide

In accordance with a similar procedure as set forth in Example 1, p-phenylazoaniline and 2-hydroxyphthalic anhydride are reacted to form an intermediate reaction product. The reaction product is then dehydrated and cyclized using acetic anhydride to form a product identified as N-[p-(phenylazo)-phenyl] - 2 - hydroxyphthalimide.

Example 15.—Preparation of N-[p-(phenylazo)phenyl]hexahydrophthalimide

Following a similar procedure set forth in Example 1, p-phenylazo-aniline and hexahydrophthalic anhydride are reacted to form an intermediate reaction product. The reaction product is then dehydrated and cyclized using acetic anhydride to form a product identified as N-[p-(phenylazo)phenyl]hexahydrophthalimide.

Example 16.—Preparation of N-[p-(phenylazo)phenyl]-3,6-endomethylene-1,2,3,6-tetrahydrophthalimide In accordance with a similar procedure as set forth in Example 1, phenylazo-aniline and 3,6-endomethylene-1,2,3,6-tetrahydrophthalic anhydride are reacted to form an intermediate reaction product. The reaction product is then dehydrated and cyclized using acetic anhydride to form a product identified as N-[p-(phenylazo)phenyl]-3,6-endomethylene-1,2,3,6-tetrahydrophthalimide.

Example 17.—Preparation of N-[p-(phenylazo)phenyl]-1,2,3,6-tetrahydro-phthalimide Following a similar procedure as set forth in Example 1, p-(phenylazo)aniline and 1,2,3,6-tetrahydrophthalic anhydride are reacted to form an intermediate reaction product. The reaction product is then dehydrated and cyclized using acetic anhydride to form a product identified as N-[p-(phenylazo)phenyl] - 1,2,3,6 - tetrahydrophthalimide.

The plastic materials with which the above described compounds can be used as combination colorants and ultraviolet light inhibitors include acrylic resins, polycarbonates, polysulfones, ethyl cellulose, polyvinyl chloride, polyvinylidene chloride, copolymers of vinyl chloride and vinylidene chloride with each other and with acrylonitrile, polyamides, polyurethanes, ABS resins, and, in particular, cellulose esters, polyesters and polyolefins.

The polyolefins may be described as poly-α-olefins derived from at least one α-monoolefinic hydrocarbon having 2–20 carbon atoms, generally 2–10 carbon atoms and usually 2–6 carbon atoms. These poly-α-olefins are normally solid resins and include copolymers, graft polymers, addition polymers, block copolymers and the like. Examples of a normally solid poly-α-olefin derived from an α-monoolefinic hydrocarbon having 2–20 carbon atoms include the linear and branched, low density and high density, crystalline and amorphous, normally solid homopolymers and copolymers of ethylene, propylene, 1-butene, isobutylene, 1-pentene, 2-methyl-1-pentene, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, allyl benzene, and the like. Processes for preparing a normally solid α-olefin polymer are well known and described in detail in the prior art. See, for example, the U.S. patent, No. 2,153,553, to Fawcett et al., the U.S. patent, No. 2,912,429, to Cash and the U.S. patent, No. 2,917,500, to Hagemeyer et al. In general, a normally solid, 1-olefin resin is a thermoplastic material which at 20° C. is solid. It includes the so-called poly-α-olefin waxes which usually have average molecular weights in a range from about 3000 to about 12,000.

The normally solid poly-α-olefin resin can also comprise other polymeric components. Thus, it can comprise a normally solid resin derived from another α-monoolefinic hydrocarbon having 2–20 carbon atoms. It can comprise at a minor concentration a different kind of polymer generally present as a physical property improver.

The cellulose esters are of acetic acid, propionic acid, butyric acid, and mixtures thereof or with other acids such as phthalic acid, all of which are prepared by well known procedures, as by use of the anhydrides of these acids. Sulfuric acid is commonly used as the esterification catalyst. The properties of these plastics depend upon the extent to which the three available hydroxyl groups, of each anhydroglucose unit of the polymer chain, are substituted. The "degree of substitution" is the average number of hydroxyl groups which are substituted with acyl radicals. This number is represented by the abbreviation "DS." The preferred cellulose esters have a total DS in the range of about 2 to 3, more preferably from about 2.2 to about 2.9. For instance, cellulose acetate having a DS of 2.3 to 2.5, cellulose triacetate having a DS of about 2.8, and cellulose acetate butyrate having a total DS of about 2.5 to 2.9, are included. Typical cellulose acetate butyrates contain 17–48% butyryl and 6–30% acetyl. The acetyl DS typically ranges from about 0.5 to 2.1 and the butyryl DS from about 0.7 to 2.0. The ratio of acetyl DS to butyryl DS is commonly in the range of about 3:1 to 1:5, preferably greater than 1:1. The moles of free hydroxyl per anhydroglucose unit usually ranges from about 0.1 to 0.5.

Suitable polyesters, including copolyesters, which may be stabilized with the described compounds can be defined as those polyesters having the repeating unit

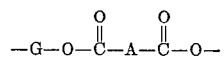

wherein G is a divalent organic residue after reaction of the hydroxyl groups of a glycol or diphenol and A is a divalent organic residue after reaction of the carboxy groups of a dicarboxylic acid. It should be noted that G and A may vary along the length of the polyester as in the case in copolyesters. Examples of the diols and diacids which are defined by G and A include Ethylene glycol
1,3-propylene glycol
1,4-butanediol
1,5-pentanediol
1,6-hexanediol
1,7-heptanediol
1,8-octanediol
1,9-nonanediol
1,10-decanediol
2,2-dimethyl-1,3-propanediol
1,4-cyclohexanedimethanol
Polyoxytetramethylene glycol
2,2,4,4-tetramethyl-1,3-cyclobutanediol
Succinic acid
Sebacic acid
Azelaic acid
Adipic acid
Glutaric acid
Trans-cyclohexene-1,4-dicarboxylic acid
Cis/trans-cyclohexane-1,4-dicarboxylic acid
Isophthalic acid
o-Phthalic acid
Terephthalic acid
Isosebacic acid
Carbonic acid
Pimelic acid
Dimethylmalonic acid
2,6-naphthalenedicarboxylic acid
Suberic acid
1,12-dodecanedicarboxylic acid
4,4'-sulfonyldibenzoic acid
4,4'-methylenedibenzoic acid Under the concepts of this invention the previously described dual purpose compounds may be at a concentration in a range from about 0.01 to about 10% by weight of the plastic material. The preferred range when ultraviolet light stability is the primary objective is from about 0.1 to about 3% by weight, the preferred range when color is the primary objective is about 0.05 to about 5% by weight, and the preferred range when color and ultraviolet light stability stand about equal in objective, is about 0.1 to about 5% by weight of the plastic material.

The plastic compositions of this invention are made by incorporating the dual purpose compounds into the plastic materials. Generally, such incorporation is performed by any one of a number of known methods, such as, for example, roll compounding, extrusion, solvent mixing and the like. For instance, such incorporation can be performed by heating or otherwise softening the plastic material to a workable consistency and then working in, as by roll compounding, the dual purpose compounds until a substantially uniform blend or dispersion is obtained. Generally, such incorporation takes place at the same time that other additives are normally incorporated into the plastic materials and usually along with such other additives as the formulation of the particular plastic composition requires. These other additives may include plasticizers, heat stabilizers, fillers, property improvers, slip agents, anti-static agents, and the like.

These plastic compositions are useful in coatings and as a material of construction for shaped articles. Thus, the composition can be made into various shaped articles such as, for example, pellets, sheeting, films, bars, tubes, filaments, fibers, specially shaped structural elements and the like as by conventional casting and molding techniques which include extrusion, blow molding and the like.

These plastic compositions are further illustrated by the following examples of various aspects thereof, including preferred specific embodiments of the invention.

Example 18

This example illustrates a specific embodiment of a yellow polyethylene composition.
The formulation of this embodiment is:

| Components: | Parts by weight |
|---|---|
| Normally solid polyethylene | 100 |
| N-(p-phenylazophenyl)maleimide | 1 |

This specific embodiment is made by hot roll compounding the components for 5 minutes with the front roll being at 270° F. and the rear roll being at 220° F.

The specific composition thus obtained is a yellow, ultraviolet light stabilized material which can be shaped as by compression molding into useful articles.

Example 19

This example illustrates a specific embodiment of a yellow polypropylene composition.
The formulation of this composition is:

| Components: | Parts by weight |
|---|---|
| Normally solid polypropylene | 100 |
| N-(p-phenylazophenyl)maleimide | 1 |

This specific embodiment is made by admixing the components in an inert atmosphere in a C. W. Brabender Plastograph.

There is thus obtained a yellow, ultraviolet light stabilized, polypropylene composition which can be shaped as by injection molding and the like into useful articles.

Example 20

This example illustrates a specific embodiment of a yellow poly(1-butene) composition.
The formulation of this specific embodiment is:

| Components: | Parts by weight |
|---|---|
| Normally solid poly(1-butene) | 100 |
| N-(p-phenylazophenyl)maleimide | 1 |

This specific embodiment is made by admixing the components in an inert atmosphere in a C. W. Brabender Plastograph.

The product thus obtained is a yellow, ultraviolet light stabilized, poly(1-butene) composition which can be formed as by injection molding into useful articles.

Example 21

This example illustrates a specfiic embodiment of an amber polyester composition.
The formulation of this specific embodiment is:

| Components: | Parts by weight |
|---|---|
| Polyester of terephthalic acid and ethylene glycol | 100 |
| N - [4 - (p - chlorophenylazo) - 2,5 - diethoxyphenyl]maleimide | 1 |

This specific embodiment is made by melt blending the components. The product thus obtaned is an amber, ultraviolet light stabilized, polyester composition which can be formed into useful articles by molding or extruding.

Example 22

This example illustrates a specific embodiment of a dark red polyester composition.
The formulation of this specific embodiment is:

| Components: | Parts by weight |
|---|---|
| Polyester of terephthalic acid and cyclohexyldimethanol | 100 |
| N - [4 - (m - propionamidophenylazo) - 2,5 - diethoxyphenyl]maleimide | 1 |

This specific embodiment is made by melt blending the components. The product thus obtained is dark red, ultraviolet light stabilized, polyester composition which can be formed into useful articles by molding or extruding.

Example 23

This example illustrates a specific embodiment of a yellow polyester composition.
The formulation of this specific embodiment is:

| Components: | Parts by weight |
|---|---|
| Copolyester of terephthalic acid, isophthalic acid and ethylene glycol | 100 |
| N - [p - (2 - methoxyphenylazo)phenyl]maleimide | 1 |

This specific embodiment is made by melt blending the components. The product thus obtained is a yellow, ultraviolet light stabilized, polyester composition which can be formed into useful articles by molding or extruding.

Example 24

This example illustrates a specific embodiment of an orange cellulose acetate butyrate composition.
The formulation of this specific embodiment is:

| Components: | Parts by weight |
|---|---|
| Cellulose acetate butyrate | 100 |
| N-[p-(p-nitrophenylazo)phenyl]maleimide | 1 |

This specific embodiment is made by hot roll compounding the components. The product thus obtained is an orange, ultraviolet light stabilized, cellulose acetate butyrate composition which can be formed into useful articles by conventional techniques.

Example 25

This example illustrates a specific embodiment of a light yellow cellulose acetate propionate composition.
The formulation of this specific embodiment is:

| Components: | Parts by weight |
|---|---|
| Cellulose acetate propionate | 100 |
| N-[4-(o-tolylazo)-2,5-dimethyl]maleimide | 1 |

This specific embodiment is made by hot roll compounding the components. The product thus obtained is a light yellow ultraviolet light stabilized, cellulose acetate propionate composition which can be made into useful articles by conventional techniques.

Example 26

This example illustrates a specific embodiment of a yellow cellulose acetate composition.

The formulation of this specific embodiment is:

| Components: | Parts by weight |
|---|---|
| Cellulose acetate | 100 |
| N - [p - (2 - methoxy - 4 - acetoxyphenylazo)-phenyl]maleimide | 1 |

This specific embodiment is made by hot roll compounding the components. The product thus obtained is a yellow, ultraviolet light stabilized, cellulose acetate composition which can be made into useful articles by conventional techniques.

Example 27

This example illustrates a specific embodiment of a yellow polypropylene composition.

The formulation of this specific embodiment is:

| Components: | Parts by weight |
|---|---|
| Polypropylene | 100 |
| N-[p-(phenylazo)phenyl]succinimide | 1 |

This specific embodiment is made by admixing the components in an inert atmosphere in a C. W. Brabender Plastograph. The product thus obtained is a yellow, ultraviolet light stabilized, polypropylene composition capable of being formed into useful products by conventional techniques.

Example 28

This example illustrates a specific embodiment of a yellow polyethylene composition.

The formulation of this specific embodiment is:

| Components: | Parts by weight |
|---|---|
| Polyethylene | 100 |
| N-[p - (phenylazo)phenyl] - 2 - (1 - decen - 1-yl)succinimide | 1 |

This specific embodiment is made by admixing the components in an inert atmosphere in a C. W. Brabender Plastograph. The product thus obtained is a yellow, ultraviolet light stabilized, polyethylene composition which may be formed into useful products by conventional techniques.

Example 29

This example illustrates a specific embodiment of a yellow polyester composition.

The formulation of this specific embodiment is:

| Components: | Parts by weight |
|---|---|
| Polyester of terephthalic acid and cyclohexyldimethanol | 100 |
| N-[p-(phenylazo)phenyl]glutarimide | 1 |

The specific embodiment is made by melt blending the components. The product thus obtained is a yellow, ultraviolet light stabilized, polyester composition which can be formed into useful articles by molding or extruding.

Example 30

This example illustrates a specific embodiment of a yellow cellulose ester composition.

The formulation of this specific embodiment is as follows:

| Components: | Parts by weight |
|---|---|
| Cellulose acetate butyrate | 100 |
| N-[p-(phenylazo)phenyl]phthalimide | 1 |

This specific embodiment is made by hot roll compounding the components. The products thus obtained is a yellow, ultraviolet light stabilized, cellulose acetate butyrate composition which can be made into useful articles.

The following examples particularly illustrate the effectiveness of the previously described dual purpose compounds as ultraviolet light inhibitors for plastic compositions.

In the first series of tests the samples were made from a normally solid polyethylene having a density of 0.918. The formulation of each sample is indicated in the following table. The samples were made by hot roll compounding the components for about 5 minutes. Each sample thus obtained was compression molded into plates 0.125 and 0.060 inch thick.

The 0.060 inch thick plates were placed outdoors at Kingsport, Tennessee. Periodically, infrared measurements were made on the 0.060 inch plates to determine the increase in carbonyl content. The exposure time required to produce an increase of 10 units of carbonyl content was thereby determined for each sample.

The 0.125 inch thick plate of each sample was cut into ten specimens 0.5 inch x 1.5 inches and the specimens were bent into U-shape and while thus stressed inserted upside down in an aluminum channel 0.5 inch wide. While thus mounted under stress, the specimens of each sample were exposed to natural weathering outdoors at Kingsport, Tenn. Periodically, the specimens were inspected for the development of stress cracks visible to the unaided eye. When stress cracks had developed in half of the exposed specimens of a sample the exposure time required to reach this condition was determined. This exposure time was considered to be the stress crack free life of the sample. Also observed for each sample was the color change of the plate during this exposure.

The results of the above testing are summarized in the following table.

TABLE 1

| Sample No. | Polyethylene plus the following Additive | Concentration in parts by wt. | Stress Crack Free Life (Mo.) | Days Exposure Required for Increase of 10 Units of Carbonyl Content | Color Changes During Exposure |
|---|---|---|---|---|---|
| 1 | | | 12 | 60 | None. |
| 2 | N-(p-phenylazophenyl)maleimide | 1 | 51 | 360 | Do. |
| 3 | Lead chromate | 5 | 12 | (¹) | Slight darkening. |
| 4 | Sun Yellow (a commercial pigment) | 5 | 12 | (¹) | Do. |

¹ Opaque to Infrared.

Sample No. 2 corresponds to a specific embodiment of this invention. These data show that the polyethylene composition of sample 2 was light fast. Moreover, these data show that N-(p-phenylazophenyl)maleimide protected the polyethylene from stress cracking for four years and from the development of appreciable carbonyl content for approximately one year.

In another series of tests the samples were made from crystalline polypropylene having an inherent viscosity of 1.4. The samples were made by admixing the components in an inert atmosphere in a C. W. Brabender Plastograph. The components of each sample consisted essentially of the crystalline polypropylene and the additives indicated in the following table. The samples as made were granulated and then injection molded into tensile bars 1/16 inch thick and 2½ inches long. Three tensile bar specimens of each sample were bent into a U and inserted upside down while thus bent into a channel ⅝ inch wide. The tensile bar specimens thus mounted were then placed into a modified Atlas Twin-Arc Weather-Ometer [Anal. Chem., 25 460 (1953)]. Periodically, the specimens were inspected for the development of stress cracks visible under 3× magnification. When all three specimens of a sample had developed 3× visible stress cracks, the stress crack free life of the sample was then determined, it being the averaged exposure in hours required to develop cracks in all three specimens. The specimens were also inspected for changes in color. The results of these tests are summarized in the following table.

TABLE 2

| Sample No. | Polypropylene plus the following Additive | Concentration in Parts by Wt. | Sterss Crack Free Life (Hrs.) | Color Change During Exposure |
|---|---|---|---|---|
| 1 | None | | 90 | Slight yellowing. |
| 2 | N-(p-phenylazophenyl)maleimide | 1 | 1,310 | None. |
| 3 | Lead chromate | 5 | 140 | Slight darkening. |
| 4 | Titanium IV oxide | 1.5 | 90 | Slight yellowing. |
| 5 | Polyester Yellow 5GLS | 1 | 330 | None. |

Sample No. 2 corresponds to a specific embodiment of this invention. The data show that the polypropylene composition of this invention has good color retention and outstanding weather stability.

In another series of tests the samples were made from a normally solid poly(1-butene) having an inherent viscosity of 1.5. The samples were made by admixing the components in an inert atmosphere in a C. W. Brabender Plastograph. The samples consisted essentially of the normally solid poly(1-butene) and the additives indicated in the following table. In each case the sample was granulated and injection molded into three tensile bars ⅟₁₆ inch thick and 2½ inches long. The tensile bar specimens were bent into a U and while thus under stress inserted upside down in ⅝ inch wide channel. While thus mounted the tensile bar specimens were placed into the modified Atlas Twin-Arc Weather-Ometer. Periodically the specimens were inspected for the development of stress cracks visible under 3× magnification. The stress crack free life in hours, the averaged exposure time required to develop stress cracks in all three specimens, was thereby determined. The specimens were also inspected for color change. The test results are summarized in the following table.

TABLE 3

| Sample No. | Polypropylene plus the following Additive | Concentration in Parts by Wt. | Stress Crack Free Life (Hrs.) | Color Change During Exposure |
|---|---|---|---|---|
| | None | | 135 | Yellowed. |
| | N-(p-phenylazophenyl)maleimide | 1 | 1,950 | None. |
| | Lead chromate | 5 | 260 | Darkened. |
| | Polyester Yellow 5 GLS | 1 | 390 | None. |

Sample No. 2 corresponds to a specic embodiment of the invention. These data show that N-(p-phenylazophenyl) maleimide in poly(1-butene) is light fast and confers on the 1-olefin resin an exceptional stability to weathering.

Further testing was performed on samples of polypropylene containing conventional antioxidants and the dual purpose compounds previously described in this invention to evaluate the stability of the samples toward ultraviolet light. The compounds to be evaluated were incorporated into polypropylene containing 0.1% 2,6-di-tert.-butyl-pccresol and 0.3% dilauryl-thiodipropionate by dissolving 0.4 g. of polypropylene containing the above mentioned antioxidants and 0.04 g. of the compound to be evaluated in 10 ml. of tetralin by heating at 140 C. for 30 minutes. Each sample solution was cast on a ferrotype plate maintained at 143° C. and the solvent was evaporated to leave a 3 mil thick film. A control film containing only polypropylene and the antioxidants was also prepared for comparative purposes. Specimens 2½ x ½ inch were cut from the films and exposed to natural weathering at Kingsport, Tenn., and the exposure time required to produce embrittliment was determined. A stabilization factor was calculated as follows:

$$\text{Stabilization Factor} = \frac{\text{Exposure Time to Embrittle Sample Film}}{\text{Exposure Time to Embrittle Control Film}}$$

The results of these tests are summarized in the following table:

TABLE 4

| Additive at 1% concn. level in polypropylene [a]: | Stabilization factor |
|---|---|
| Control (none) | [b] 1.0 |
| N-[p-(phenylazo)phenyl]maleimide | 3.6 |
| N - [4-(o-tolylazo)-2,5 - dimethylphenyl]maleimide | 3.6 |
| N-[p-(nitrophenylazo)phenyl]maleimide | 2.5 |
| N - [p-(2-methoxy-4-acetoxyphenylazo)phenyl]maleimide | 2.5 |
| N-[4-(m-propionamidophenylazo)-2,5-diethoxyphenyl]maleimide | 2.0 |
| N - [4-(p-chlorophenylazo)-2,5-diethoxyphenyl]maleimide | 1.8 |
| N - [p - (p - methoxyphenylazo)phenyl]maleimide | 1.4 |

[a] Contained 0.10% 2,6-di-tert-butyl-p-cresol and 0.3% dilauryl-3,3'-thiodipropionate as antioxidants.
[b] The actual aging life of polypropylene containing only the indicated antioxidants was 20 days in Kingsport, Tenn.

The results of use of these tests show the increased stability of polypropylene containing the dual purpose compounds of this invention.

Additional testing was performed on samples of cellulose acetate butyrate (13% acetyl, 38% butyryl) containing 12% dibutyl sebacate as a plasticizer and the dual purpose compounds previously described in this invention to evaluate the stability of the samples toward ultraviolet light. The compounds to be evaluated were incorporated into the plasticized cellulose actate butyrate by hot roll compounding wherein the front and rear rolls were maintained at 270° F. and 230° F., respectively The compounds were incorporated at a concentration of about 0.5% by weight of the cellulose acetate butyrate. 5 mil thick films were fabricated from the several formulations and specimens 2½ x ½ inch were cut therefrom. These specimens were exposed in an Atlas XWR Weather- Ometer and their weatherability evaluated. The results of the weathering tests are sumarized in the following table:

TABLE 5

| Additive at 0.5% Concn. Level in Plasticized Cellulose Acetate Butyrate a | Weather-Ometer Exposure to Produce Embrittlement, Hrs. | Color Change Exposure of 600 Hrs. |
|---|---|---|
| Control (none) | 497 | No Color. |
| N-[p-(phenylazo)phenyl]maleimide | b>1,000 | Slight Fade. |
| N-[p-(p-nitrophenylazo)phenyl]maleimide | >1,000 | No Change. |
| N-[p-(p-methoxyphenylazo)phenyl]maleimide | >1,000 | Do. |
| N-[p-(2-methoxy-4-acetoxyphenylazo)phenyl]maleimide | >1,000 | Do. |
| N-[4-(p-chlorophenylazo)2,5-diethoxyphenyl]maleimide | >1,000 | Slight Fade. |
| N-[4-(o-tolylazo)-2,5-dimethylphenyl]maleimide | 887 | No Change. |
| N-[4-(m-propionamidophenylazo)-2,5-diethoxyphenyl]maleimide | 887 | Fade. | a Contains 12% dibutyl sebacate as a plasticizer.
b Exposure to date, tests continuing.

The results of these tests show the increased stability of cellulose acetate butyrate containing the dual purpose compounds of this invention. In addition, it is generally shown that most of the dual purpose compounds exhibit good properties of light fastness.

I claim:
1. A compound defined by the formula:

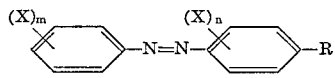

wherein $m$ is an integer of 0–6 and $n$ is an integer of 0–4; each X is a radical independently selected from the group consisting of hydrogen, chlorine, bromine, alkyl having 1–20 carbon atoms, alkoxy having 1–20 carbon atoms, hydroxy, cyano, amino, (lower alkyl)amino, hydroxy (lower alkyl)amino, cyano(loweralkyl)amino, phenylamino, nitro, sulfamido, trifluoromethyl, phenyl, naphthyl, (lower alkyl)phenyl, (lower alkoxy)phenyl, benzoyloxy, phenoxy, (lower alkyl)sulfonyl, morpholino, thiomorpholino, and triazeno; and R is selected from the group consisting of:

(A) 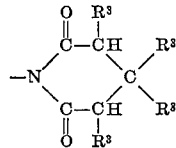

wherein each $R^3$ is a radical independently selected from the group consisting of hydrogen, alkyl having 1–20 carbon atoms, alkoxy having 1–20 carbon atoms, phenyl, naphthyl, (lower alkyl)phenyl, hydroxy, cyano, chlorine and bromine;

(B) 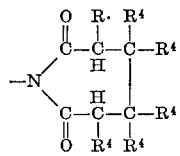

wherein each $R^4$ is a radical independently selected from the group consisting of hydrogen, alkyl having 1–20 carbon atoms, alkoxy having 1–20 carbon atoms, phenyl, naphthyl, (lower alkyl)phenyl, hydroxy, cyano, chlorine and bromine;

(C) 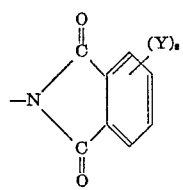

wherein $s$ is an integer of 0–4; and each Y is a radical independently selected from the group consisting of hydrogen, alkyl having 1–20 carbon atoms, alkoxy having 1–20 carbon atoms, phenyl, naphthyl, (lower alkyl)phenyl, hydroxy, cyano, chlorine and bromine;

(D) 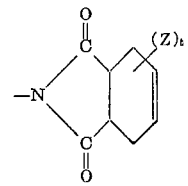

wherein $t$ is an integer of 0–4; and each Z is a radical independently selected from the group consisting of hydrogen, alkyl having 1–20 carbon atoms, alkoxy having 1–20 carbon atoms, phenyl, naphthyl, (lower alkyl)phenyl, hydroxy, cyano, chlorine and bromine;

(E) 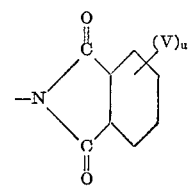

wherein $u$ is an integer of 0–4; and each V is a radical independently selected from the group consisting of hydrogen, alkyl having 1–20 carbon atoms, alkoxy having 1–20 carbon atoms, phenyl, naphthyl, (lower alkyl)phenyl, hydroxy, cyano, chlorine and bromine; and (F) 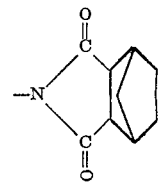

2. A compound according to claim 1 which is defined by the formula

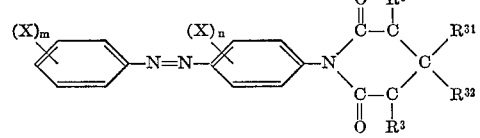

3. A compound according to claim 1 which is defined by the formula:

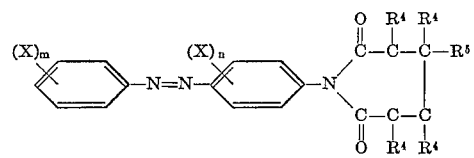

4. A compound according to claim 1 which is defined by the formula:

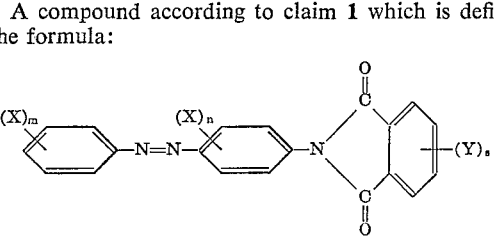

5. A compound according to claim 1 which is defined by the formula:

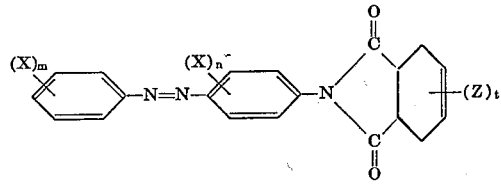

6. A compound according to claim 1 which is defined by the formula:

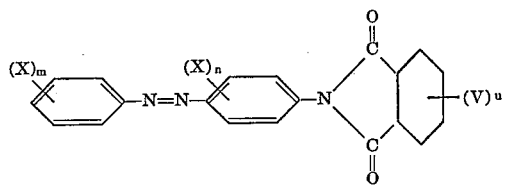

7. A compound according to claim 1 which is defined by the formula:

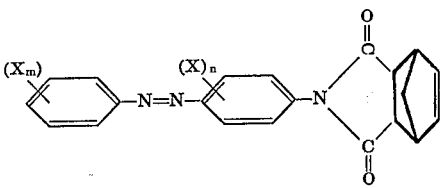

8. N-[p-(phenylazo)phenyl]glutarimide.
9. N-[p-(phenylazo)phenyl] phthalimide.
10. N-[p - (phenylazo)phenyl] - 1,2,3,6 - tetrahydrophthalimide.
11. N-[p-(phenylazo)phenyl] hexahydrophthalimide.
12. N-[p - (phenylazo)phenyl] - 3,6 - endomethylene-1,2,3,6-tetrahydrophthalimide.

References Cited

UNITED STATES PATENTS 2,933,365  4/1960  Moore _____ 260—152 XR

OTHER REFERENCES

Sawick: J. Org. Chem., vol. 22, pp. 915 to 919 (1957).

FLOYD D. HEGEL, *Primary Examiner.*

U.S. Cl. X.R.

8—4, 41, 50; 117—138.8; 260—37, 40, 41, 41.5, 157

UNITED STATES PATENT OFFICE
CERTIFICATE OF CORRECTION

Patent No. 3,454,550                                             July 8, 1969

Gordon Clay Newland

It is certified that error appears in the above identified patent and that said Letters Patent are hereby corrected as shown below:

Column 15, line 32, "0-6" should read -- 0-5 --; Formula (B should appear as shown below:

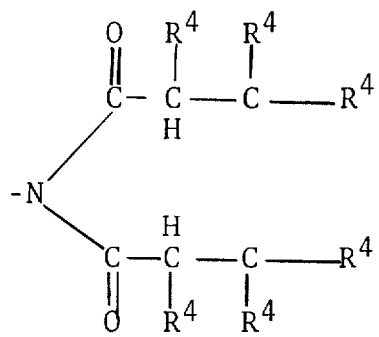

Column 16, the formula of claim 3 should appear as shown below:

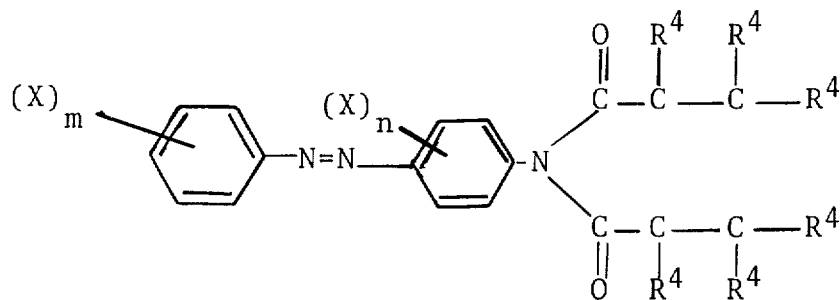

Column 18, the formula of claim 7 should appear as shown below:

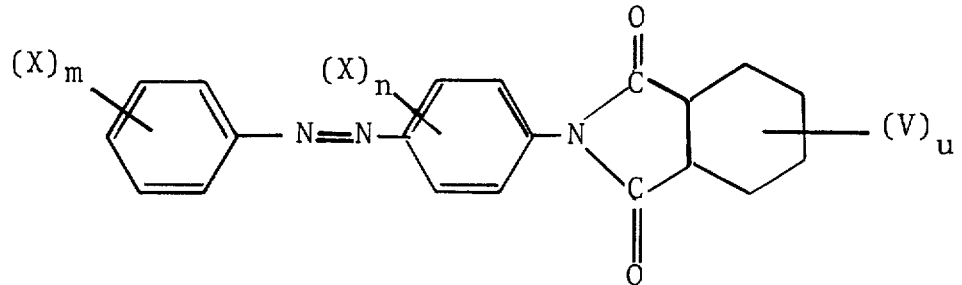

Signed and sealed this 12th day of May 1970.

(SEAL)
Attest:

EDWARD M. FLETCHER, JR.
Attesting Officer

WILLIAM E. SCHUYLER, JR
Commissioner of Patents